US008098851B2

(12) United States Patent
Stieler von Heydekampf et al.

(10) Patent No.: US 8,098,851 B2
(45) Date of Patent: Jan. 17, 2012

(54) USER INTERFACE FOR NETWORK AUDIO MIXERS

(75) Inventors: Mathias Stieler von Heydekampf, Edina, MN (US); Josh Bartunek, Chanhassen, MN (US); Lee E. Minich, Rochester, NY (US)

(73) Assignee: Mathias Stieler Von Heydekampf, Edina, MN (US)

( * ) Notice: Subject to any disclaimer, the term of this patent is extended or adjusted under 35 U.S.C. 154(b) by 165 days.

(21) Appl. No.: 12/727,579

(22) Filed: Mar. 19, 2010

(65) Prior Publication Data

US 2010/0303261 A1 Dec. 2, 2010

Related U.S. Application Data

(63) Continuation-in-part of application No. 12/474,630, filed on May 29, 2009.

(51) Int. Cl.
*H04B 1/00* (2006.01)

(52) U.S. Cl. ........................................ 381/119; 370/254

(58) Field of Classification Search .................. 381/119; 370/254

See application file for complete search history.

(56) References Cited

U.S. PATENT DOCUMENTS

| | | | |
|---|---|---|---|
| 6,122,665 | A | 9/2000 | Bar et al. |
| 7,853,342 | B2 | 12/2010 | Redmann |
| 2002/0005109 | A1 | 1/2002 | Miller |
| 2002/0144587 | A1 | 10/2002 | Naples et al. |
| 2007/0140510 | A1 | 6/2007 | Redmann |
| 2008/0167740 | A1 | 7/2008 | Merrill |
| 2010/0303260 | A1 | 12/2010 | Stieler von Heydekampf et al. |

FOREIGN PATENT DOCUMENTS

| | | | |
|---|---|---|---|
| EP | 1319299 | B1 | 12/2005 |
| WO | 02/25889 | A2 | 3/2002 |
| WO | 2010/138299 | A2 | 12/2010 |
| WO | 2010/138299 | A3 | 2/2011 |

OTHER PUBLICATIONS

Office Action received for the German Application No. 10 2009 059 167.2, mailed on Jul. 26, 2011, 7 pages of Office Action and 3 pages of English Translation.

PCT Search Report received for the PCT Application No. PCT/US2010/034322, mailed on Dec. 20, 2010, 3 pages.

*Primary Examiner* — Douglas Menz
(74) *Attorney, Agent, or Firm* — Cool Patent P.C.

(57) ABSTRACT

Briefly, in accordance with one or more embodiments, a first mixer connects to a network and if a second mixer is detected on the network, the first mixer obtains an identifier for the second mixer, adds one or more audio signals from the second mixer to a mix of the first mixer, and stores a mix setting for the second mixer on the first mixer. If the second mixer is subsequently connected to the first mixer, the first mixer obtains the identifier for the second mixer, recalls the stored mix setting for the second mixer based at least in part on the identifier, and adds one or more audio signals from the second mixer to a present mix of the first mixer based at least in part on the recalled mix setting.

20 Claims, 8 Drawing Sheets

USER INTERFACE FOR NETWORK AUDIO MIXERS

CROSS-REFERENCE TO RELATED APPLICATIONS

The present application is a continuation-in-part of U.S. application Ser. No. 12/474,630 filed May 29, 2009 (pending) by inventors Mathias Stieler von Heydekampf and Lee Minich titled "Decentralized Audio Mixing and Recording". Said application Ser. No. 12/747,630 is hereby incorporated herein by reference in its entirety.

BACKGROUND

In an environment in which musicians hold rehearsals or recording sessions, or for general live performances and/or live recording, one or more mixers may be utilized to capture one or more audio signals of one or more musicians, vocalists, or other audio sources. Capturing the perfect mix may involve painstaking effort and/or skill on the part of the musician or engineer generating the mix. Furthermore, each musician or performer may desire to have his or her own personal mix that is unique to the other musicians or performers, for example when monitoring one's own personal performance in a band relative to the performance of the other musicians or performers. For multiple subsequent rehearsals, recording sessions or performances, a great deal of effort and time may be involved to recreate that unique, personal mix again which may detract from valuable time that could have otherwise been spent on the actual performance.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
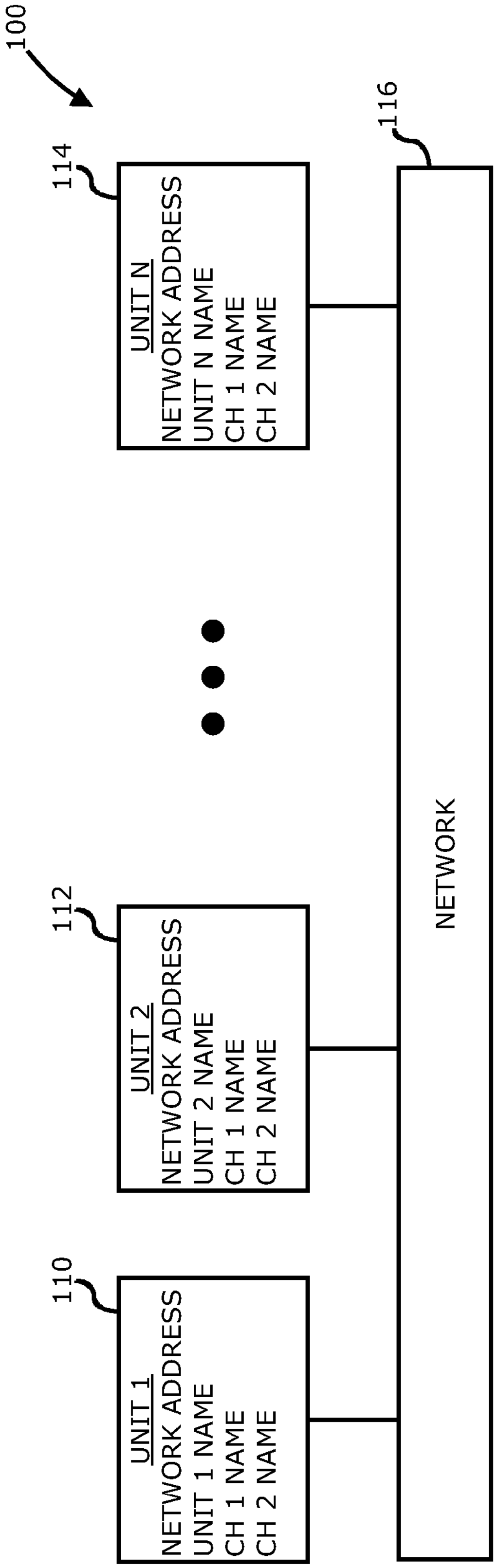
FIG. 1 is a block diagram of multiple mixers coupled via a network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of multiple mixers coupled via a network in accordance with one or more embodiments will be discussed. As shown in FIG. 1, a mixing system 100 may comprise one or more mixers 110, 112, up to an Nth mixer 114, generally referred to as units, coupled via network 116. One or more of the mixers may include information stored thereon describing the network address of the mixer, for example a media access control (MAC) address or the like, the name of the mixer, and the name of one or more channels that the mixer is capable of handling. For purposes of discussion, one or more of the mixers will have two channels, channel 1 (CH 1) and channel 2 (CH 2), however the scope of the claimed subject matter is not limited in this respect wherein a mixer may have any number of channels.

In one or more embodiments, mixing system 100 may comprise a decentralized mixing system that may comprise an expandable, decentralized audio signal mixing system capable of utilizing networking technology for real-time, or near real-time, audio applications with integrated multi-track recording capability. Decentralized mixing system may comprise one or more mixers 110, 112, or 114 capable of coupling to network 116 to provide interconnectivity between two or more mixers 110, 112, or 114. An example of such decentralized mixing system is shown in and described with respect to copending U.S. application Ser. No. 12/474,630 filed May 29, 2009 and which is incorporated herein by reference in its entirety for any and all purposes. However, a decentralized mixing system is merely one example type of mixing system 100, and the scope of the claimed subject matter is not limited in this respect.

In one or more embodiments, network 116 may comprise standard networking technology as such an interconnectivity backbone, wherein network may operate in compliance with one or more networking standards such as Ethernet, Fast Ethernet100BASE-T with Ethernet Audio Video Bridging (AVB) in accordance with an Institute of Electrical and Electronics Engineers (IEEE) standard such as IEEE 802.1, IEEE 802.1ak, IEEE 802.1AB, IEEE 802.1AS, IEEE 802.1D, IEEE 802.1Q, IEEE 802.1Qat, IEEE 802.1Qav, Universal Serial Bus (USB), IEEE 1394, and so on, although the scope of the claimed subject matter is not limited in this respect. In some embodiments, network 116 may comprise an audio network and/or bus such as a Dante audio network or the like type of connectivity protocol as merely one example, and the scope of the claimed subject matter is not limited in this respect. In one or more embodiments, at least a portion or all of network 116, may comprise a wired link based network, and in one or more alternative embodiments, at least a portion or all of network 116 may comprise a wireless link based network. In embodiments where network 116 at least in part comprises a wireless link based network, network 116 may be in compliance with one or more wireless standards such as, for example, IEEE 802.11a, IEEE 802.11b, IEEE 802.11g, IEEE 802.11n, and so on, for example where network 124 comprises a wireless local area network (WLAN). Alternatively, network 116 may at least in part comprise a personal area network (PAN) such as a Bluetooth or Ultra-wide band (UWB) type network, Wireless Universal Serial Bus (WUSB), and/or in some embodiments network 116 may at least in part comprise a wireless wide area network (WWAN) such as a Third-Generation (3G) network, a Third Generation Partnership Project (3GPP) network, a Fourth-Generation (4G) network, a time division multiple access network, a code division multiple access network (CDMA) network, a wide-band code division multiple access (W-CDMA), a Worldwide Interoperability for Microwave Access (WiMAX) network, an IEEE 802.16 network, and so on. In addition to wireless communications, mixer 110 may implement wireless power and or wireless charging, for example to charge an internal battery of a mixer 110, 112, or 114 via an induction based charger. However, these are merely example standards for and/or implementations of network 116, wired and/or wireless, and wired and/or wireless power or charging, and the scope of the claimed subject matter is not limited in this respect.

In one or more embodiments, network 116 may be any network capable of coupling any number of mixers, up to a given maximum number of network devices for the given network protocol. In one or more embodiments, network 116 may be a simple single wire network coupling two units or devices, or alternatively may include any type of network switches, hubs, routers, access points, and so on, and the scope of the claimed subject matter is not limited in this respect. If one or more of the mixers 110, 112, or 114 are coupled to one or more of the other one or more mixers via network 116, the network address, unit name, channel name, and other information or data unique to a given mixer may be transmitted to one or more or all of the other mixers on network 116. For example, when unit 1 and unit 2 couple to network 116, the information unique to unit 2 will be transmitted to unit 1, and the information unique to unit 1 will be transmitted to unit 2. Likewise, for any N number of units, the information unique to all of the other N−1 units will be transmitted to a given unit, and vice-versa, so that all of the units on the network are capable of receiving all the unique information for all of the other units. The information transmitted includes but is not limited to the audio signals of the respective channels of the other units on the network. As will be discussed in further detail, below, mixers coupled to network 116 are capable of displaying, storing, mixing, recording, and/or otherwise handling the information and audio signals of the other units via a user interface of the mixer. An example display and user interface for one embodiment of a mixer is shown in and described with respect to FIG. 2, below.

Figure 2:
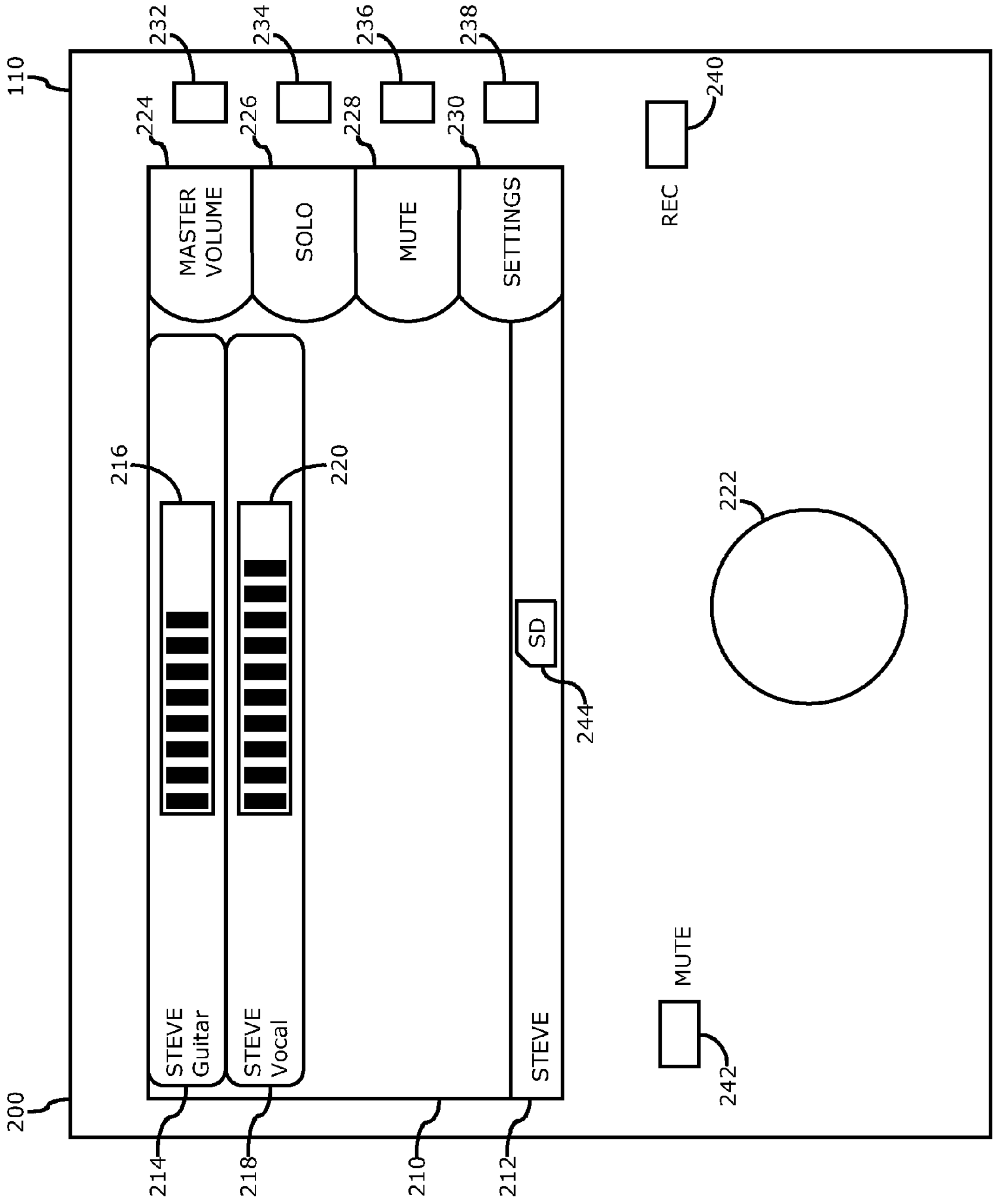
FIG. 2 is a diagram of the display and user interface of a mixer in accordance with one or more embodiments.

Referring now to FIG. 2, a diagram of the display and user interface of a mixer in accordance with one or more embodiments will be discussed. FIG. 2 illustrates an example user interface 200 of one embodiment of a mixer 110 wherein the user interface 200 may include an electronic display 210 with a first region 214 corresponding to channel 1 of the mixer and second region 218 corresponding to channel 2 of the mixer. A third region 212 on the display 210 may include text indicating the name of the mixer corresponding to the UNIT 1 NAME as shown on mixer 110 in FIG. 1. In this example, the name of the mixer 110 is displayed as "STEVE" who is the user or owner of this particular mixer 110. Region 214 shows the text for the name of channel 1 of mixer 110 which corresponds to CH 1 NAME of mixer 110 of FIG. 1. Likewise, region 218 shows the text for the name of channel 2 of mixer 110 which corresponds to CH 2 NAME of mixer 110 of FIG. 1. For purposes of example, Steve has a guitar coupled to channel 1 of the mixer 110, and a microphone for vocal coupled to channel 2 of the mixer 110. Thus, the text of region 214 may be set to read "STEVE Guitar" and the text of region 218 may be set to read "STEVE Vocal". The mix level for Steve's guitar on channel 1 may be indicated in region 214 via level indicator 216, and the mix level for Steve's vocals may be indicated in region 218 via level indicator 220. The level for a given channel of mixer 110 may be set by selecting region 214 via a control knob 222 which may be utilized to highlight the channel 1 region 214 or the channel 2 region 218. Once a channel region is highlighted, pushing down on control knob 222 may actuate a switch so that the user may adjust the mix level by twisting control knob 222. Once a desired mix level is reached, the user may exit level selection mode by again pushing knob 222. Alternatively, display 210 may include a touch screen overlay or input sensor so that a user may use a finger to touch a desired region of the display and make appropriate selections via touch and/or a combination of touch and actuation of a control knob 222 or button. Although the examples discussed herein show two channel mixers for purposes of example, additional regions on the display 210 may be utilized to show the additional channels.

User interface 200 may include various other ways for inputting information and/or controlling settings of mixer 110. As merely some examples, display 210 may include other regions for selecting various functions, such as master volume region 224, solo region 226, mute region 226, and/or settings region 230. A respective actuator button 232, 234, 236, or 238 may be disposed adjacent to a corresponding region 224, 226, 228, or 230, to activate the function of the corresponding region when pushed. Alternatively, the user may activate the functions by touching a desired region where display 210 includes touch display input. A record button 240 may be utilized to start and stop recording of the mix, for example to a memory card such as a secure digital (SD) card, the presence of which may be indicated in region 212 via an icon 244 or other text. A mute button 242 may be utilized to mute the output signal provided to an output of the mixer 110. Various other buttons, actuators, controls, pots, sliders, and so on may likewise be utilized to control any number of functions, levels, inputs, outputs, and so on, and the scope of the claimed subject matter is not limited in these respects. An example circuit architecture of a mixer 110 is shown in and described in said U.S. application Ser. No. 12/474,630 filed May 29, 2009 as but one of many examples.

Figure 3:
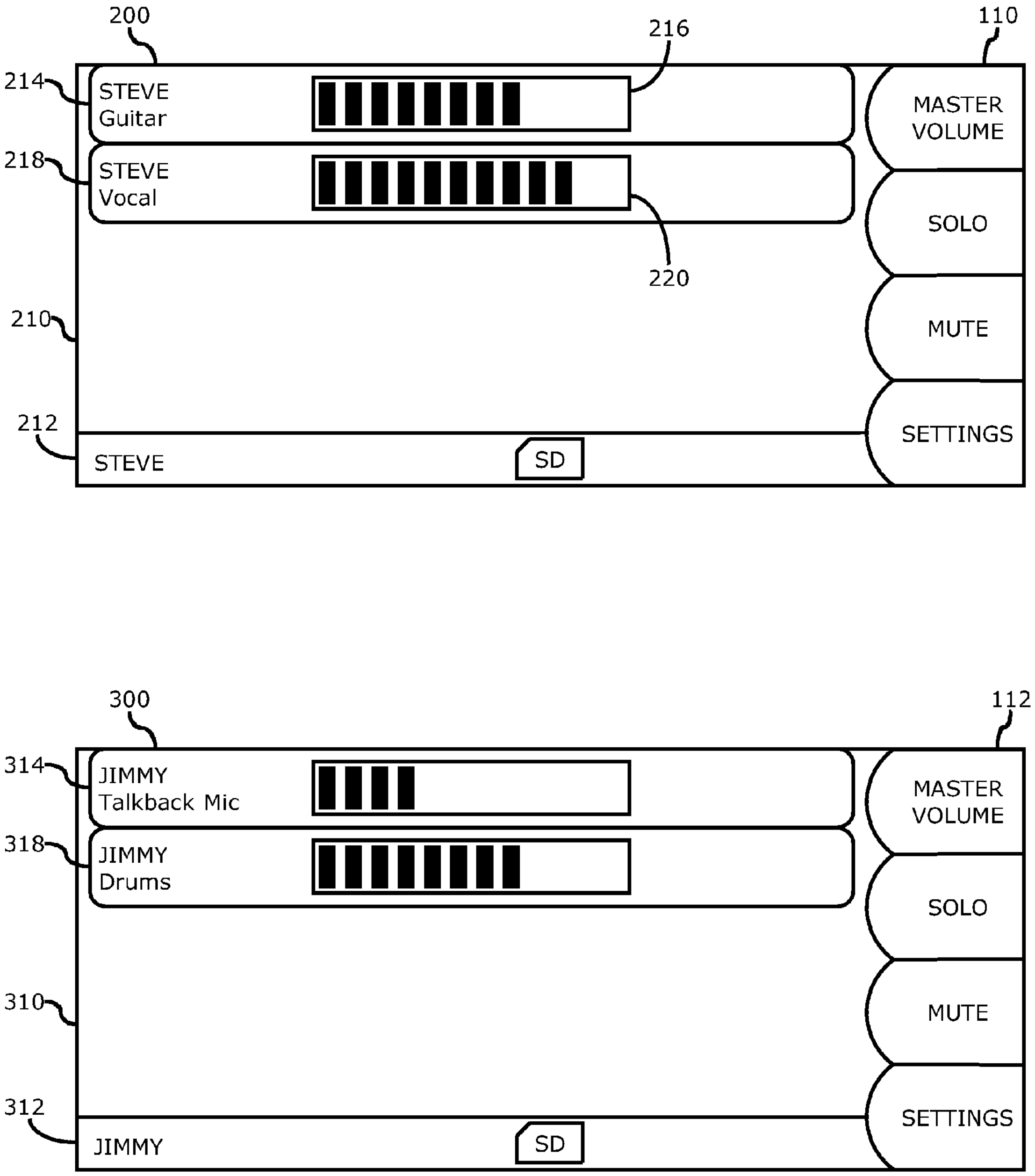
FIG. 3 is a diagram of the displays of two mixers when not coupled via a network in accordance with one or more embodiments.

Referring now to FIG. 3, a diagram of the displays of two mixers when not coupled via a network in accordance with one or more embodiments will be discussed. The user interface 200 for Steve's mixer is shown as in FIG. 3 when Steve's mixer 110 is not connected to network 116. Likewise, the user interface 300 for Jimmy's mixer is shown as in FIG. 3 when Jimmy's mixer 112 is also not connected to network 116. In this situation, Steve's display 210 shows Steve's mix for Steve's guitar on channel 1 of mixer 110 in region 214 via level indicator 216 and for Steve's Vocal on channel 2 of mixer 110 in region 218 via level indicator 220. Jimmy's display 310 shows Jimmy's mix for Jimmy's Talkback Mic on channel 1 of mixer 112 in region 314 via level indicator 316 and for Jimmy's Drums on channel 2 of mixer 112 in region 318 via level indicator 320. Steve controls the mix for the two channels of his mixer 110, and Jimmy controls the mix for the two channels of his mixer 112.

Figure 4:
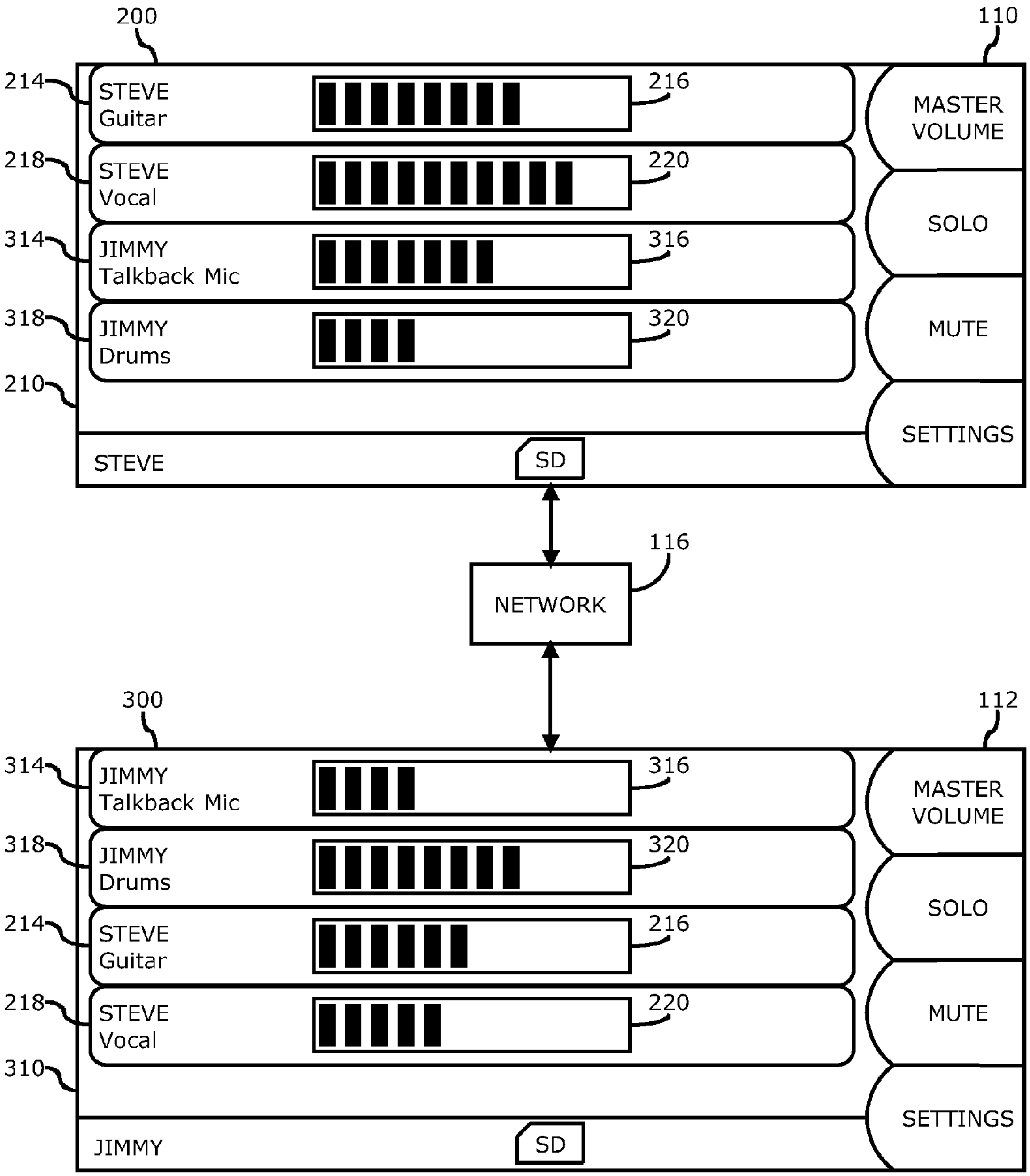
FIG. 4 is a diagram of the displays of the two mixers of FIG. 3 when the mixers are coupled via a network in accordance with one or more embodiments.

Referring now to FIG. 4, a diagram of the displays of the two mixers of FIG. 3 when the mixers are coupled via a network in accordance with one or more embodiments will be discussed. When Steve's mixer 110 and Jimmy's mixer 112 connect to network 116, Steve's mixer 110 receives information from Jimmy's mixer 112, and Jimmy's mixer 112 receives information from Steve's mixer. In such an arrangement, Jimmy's information is displayed on Steve's display 210, and Steve's information is displayed on Jimmy's display. In one or more embodiments, Steve's mixer 110 displays Jimmy's channel 1 region 314 and channel 2 region 318 on Steve's display 210. The audio signals from channel 1 and channel 2 of Jimmy's mixer 112 will also be transmitted via network 116 to Steve's mixer 110 so that Steve can hear and monitor Jimmy's channels with Steve's mixer 110 wherein Steve may add them to Steve's mix. Steve may independently control the mix of Jimmy's channels with Steve's mixer 110 as Steve controls his own channels. Likewise, in one or more embodiments, Jimmy's mixer 112 displays Steve's channel 1 region 214 and channel 2 region 218 on Jimmy's display 310. The audio signals from channel 1 and channel 2 of Steve's mixer 110 will also be transmitted via network 116 to Jimmy's mixer so that Jimmy can hear and monitor Steve's channels with Jimmy's mixer 112 wherein Jimmy may add Steve's channels to Jimmy's mix. Jimmy may independently control the mix of Steve's channels with Jimmy's mixer 112 in the same manner as Steve controls his own channels.

In one or more embodiments, the first time Steve's mixer 110 sees Jimmy's mixer on the network, the channels of Jimmy's mixer 112 may be set to a default setting in the mix, for example, always at a 50% level, or always 10% lower than Steve's lowest level. Subsequently, as Steve changes the mix level for Jimmy's channels, those levels may be stored in a memory card or other memory of Steve's mixer 110 so that when Steve's mixer 110 connects to Jimmy's mixer 112 in the future, Steve's mixer may recall the stored settings for Jimmy's channel and automatically add Jimmy's channels to the mix at the previously stored settings instead of the default mix settings. Furthermore, Steve may rename or otherwise change the information corresponding to Jimmy's mixer 112 to something different than the name that Jimmy provides for his settings for Jimmy's mixer. For example, Steve may rename Jimmy's "Talkback Mic" name for Jimmy's channel 1 to "Vocal" which may be stored as such in Steve's mixer 110. In such an arrangement, Jimmy's region 314 may display "JIMMY Talkback Mic" on Jimmy's display 310, but region 314 may display "JIMMY Vocal" on Steve's display 210.

In particular, in one or more embodiments, it should be noted that Steve may have his own independent mix settings on Steve's mixer 110 for channel 1 and channel 2 of Steve's mixer 110 and for channel 1 and channel 2 of Jimmy's mixer 112. Likewise, Jimmy may have his own independent mix settings on Jimmy's mixer 112 for channel 1 and channel 2 of Jimmy's mixer and for channel 1 and channel 2 of Steve's mixer 110. To illustrate this, as shown in FIG. 4, Steve's display 210 shows Steve's mix wherein Steve's Guitar is set to 8 volume bars at level indicator 216, Steve's Vocal is set to 10 volume bars at level indicator 220, Jimmy's Talkback Mic is set to 7 volume bars at level indicator 316, and Jimmy's Drums are set to 4 volume bars at level indicator 320. However, Jimmy may have a different mix at his mixer 112 such that Jimmy's display 310 shows Jimmy's mix wherein Jimmy's Talkback Mic is set to 4 volume bars at level indicator 316, Jimmy's Drums are set to 8 volume bars at level indicator 320, Steve's Guitar is set to 6 volume bars at level indicator 216, and Steve's Vocal is set to 5 volume bars at level indicator 220. Note that the volume bars in the level indicators represent the volume level for that channel wherein more volume bars represent a higher mix level and fewer volume bars represent a lower mix level. Steve may save Steve's mix on his mixer 110 so that when other previously connected units connect to Steve's mixer 110 again in the future, the channels of the other units may automatically be added back to Steve's mixer 110 at the previously stored levels. Likewise, Jimmy may save Jimmy's mix on his mixer 112 so that when other previously connected units connect to Jimmy's mixer 112 in the future, the channels of the other units may automatically added back to Jimmy's mixer 112 at the previously stored levels. It should be noted that if the display 210 of a local unit does not have enough area to show all of the channels for all the units to which the local unit is connected, additional pages of the display 210 may be used to show the information of the other units which may be accessed by the user, for example via control knob 222. Although FIG. 4 shows an example embodiment in which a local unit may obtain, display, control, and/or otherwise process the information from one or more other units via user interface 200 or user interface 300, multiple other variations fall within the scope of the claimed subject matter. For example, in alternative embodiments, the information obtained from other units that is displayed and processed by a local unit may include icons, images, and/or video in addition to or instead of text. Such an alternative embodiment is shown in and described with respect to FIG. 5, below.

Figure 5:
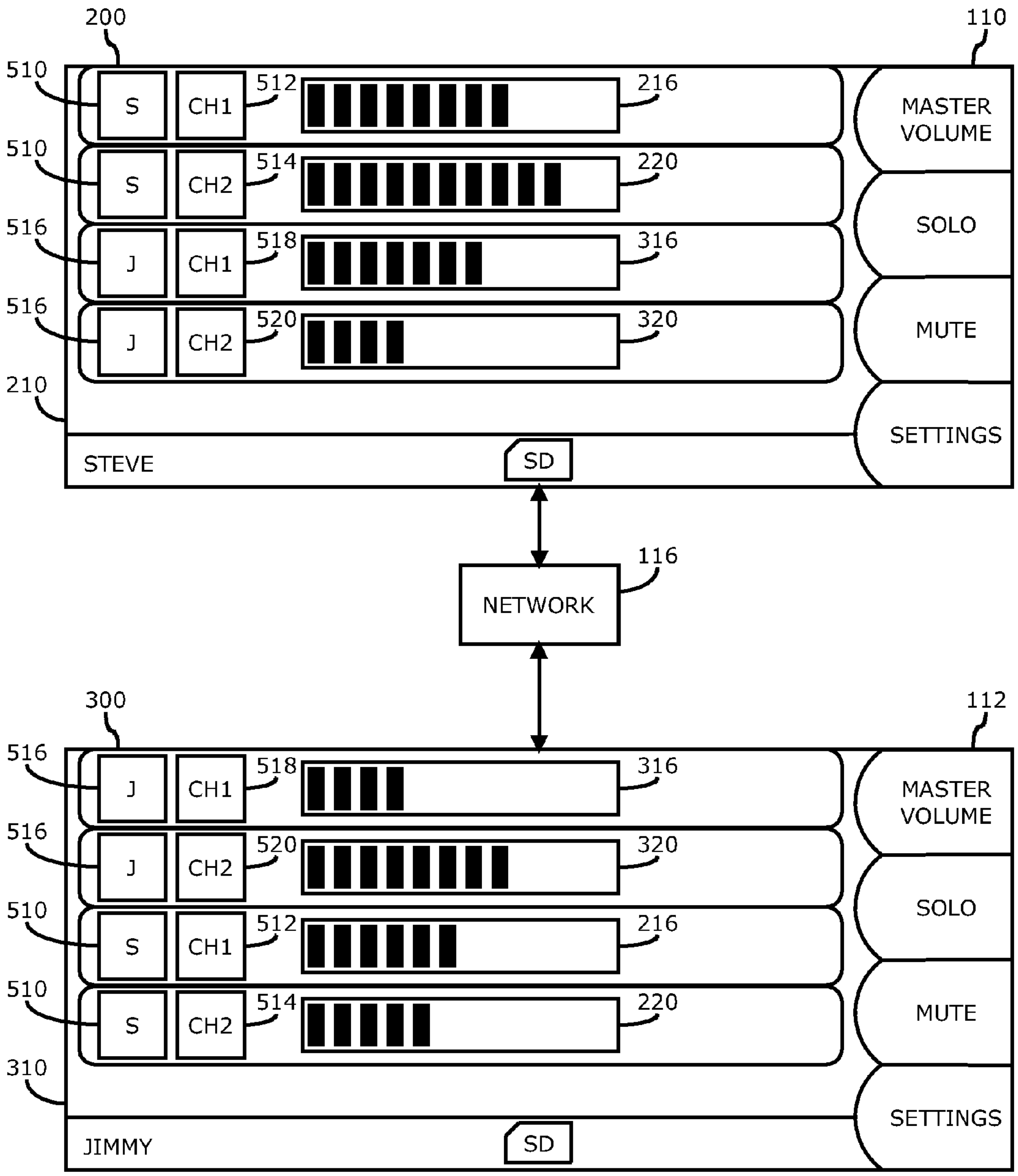
FIG. 5 is a diagram of alternative displays of the two mixers of FIG. 4 showing an alternative embodiment in which mixer information includes one or more displayed icons or images in accordance with one or more embodiments.

Referring now to FIG. 5, a diagram of alternative displays of the two mixers of FIG. 4 showing an alternative embodiment in which mixer information includes one or more displayed icons or images in accordance with one or more embodiments will be discussed. In the embodiment shown in FIG. 5, instead of using text to identify a given unit name or a channel name, an icon, image, graphic, or video clip may be utilized in addition to or in lieu of using text. For example, Steve's mixer 110 may be identified with Steve's picture 510. Likewise, Jimmy's mixer 112 may be identified with a Jimmy's picture 516. As another example, Steve's guitar on channel 1 may be identified with a guitar icon 512, and Steve's vocal on channel 2 may be identified with a microphone icon 514. Likewise, Jimmy's Talkback Mic on channel 1 may be identified with a microphone icon 518, and Jimmy's Drum on channel 2 may be identified with a drum icon 520.

Pictures of the owners or users of a given mixer may be obtained and stored by that user and then transmitted to other units via network 116. Alternatively, Steve may take a picture of Jimmy and load the picture onto Steve's mixer 110 for recall by Steve's mixer when Jimmy's mixer 112 connects to Steve's mixer 110 via network 116. Likewise, icons for various instruments may stored in any one or more units and transmitted to any one or other units via network 116 and selected by the user in the same manner as a user would name his or someone else's unit on his own unit. In some embodiments, the icon or image may be an avatar type image created by a user for himself or for another user to be stored on his local machine. Such an avatar may be a cartoon or cartoon like character representing the user of a particular machine. The type of identifier such as text, icon, image, picture, avatar, video clip, and so on may be selected for example via a settings function of the mixer.

Figure 6:
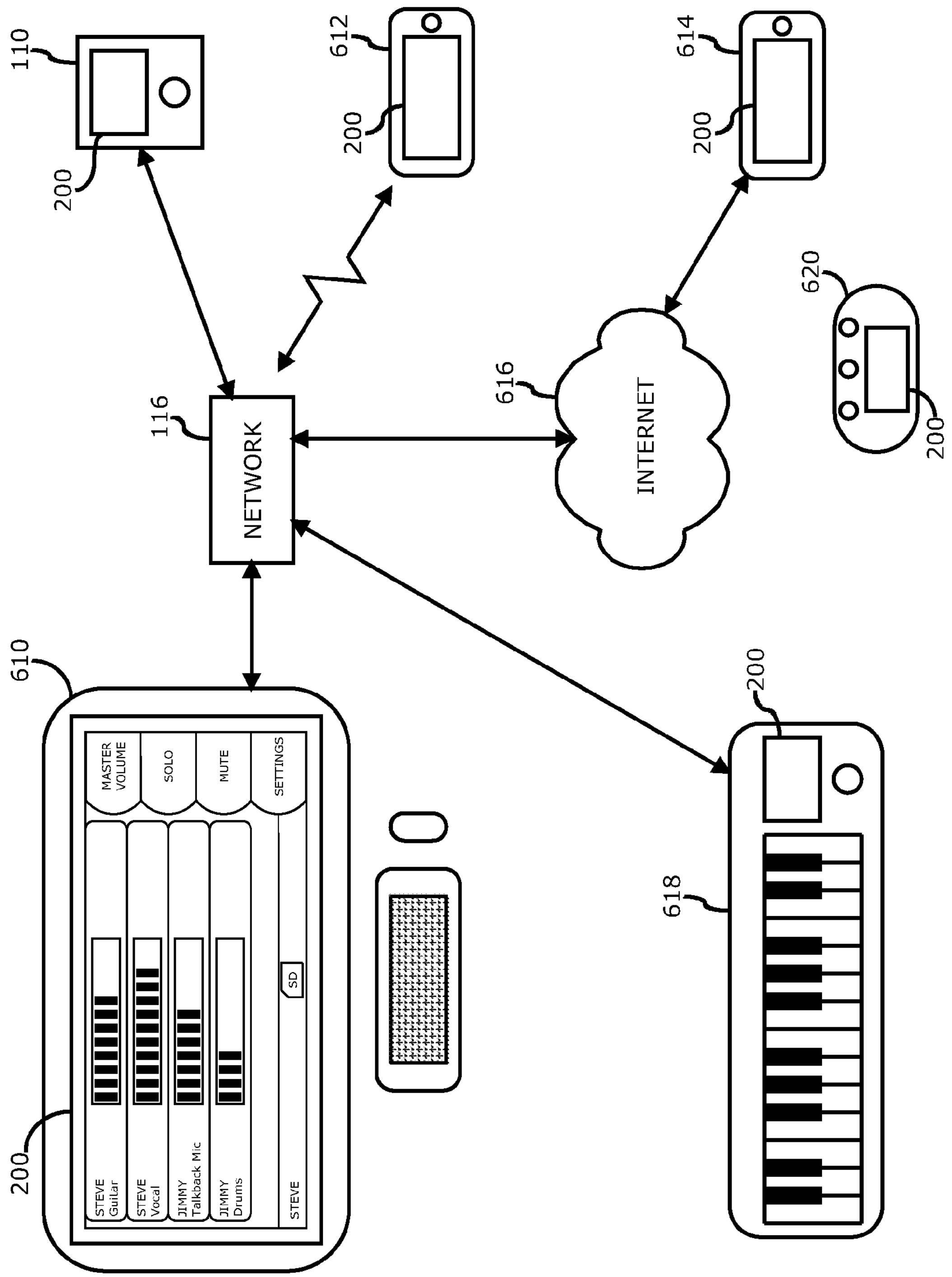
FIG. 6 is a diagram of various types of mixer units or other devices having mixer hardware and/or software in accordance with one or more embodiments.

Referring now to FIG. 6, a diagram of various types of mixer units or other devices having mixer hardware and/or software in accordance with one or more embodiments will be discussed. FIG. 6 shows that the mixing functions including a user interface as shown in and described herein may be utilized by any various type of electronic device capable of connecting to other devices via network 116. For example, the user interface 200 and/or mixing functions of a mixer such as mixer 110, 112, or mixer 114 may be integrated into a personal computer 610 via software and/or hardware installed in or coupled to personal computer 610 including a networking interface. Similarly, user interface 200 may be integrated into a standalone mixer 110 capable of connecting to network 116, a wired or wirelessly connected portable device 612 such as a music player, phone tablet, pad, netbook, and so on, or wired or wirelessly connected device 614 coupled to network 116 via another network such as the Internet 616, a digital instrument or amplifier modeler 620 capable of coupling to network 116, and/or an instrument 618 such as a keyboard, synthesizer or the like, all capable of coupling to one or more other units via network, either wired or wirelessly or directly or via another network, generally as shown in and described in FIG. 1 and incorporating a user interface 200 as shown in and described herein. It should be noted that the diagram of FIG. 6 is not limiting on how any one type of device may incorporate user interface 200 or how any one type of device may couple to one or more other devices or units via network 116, and the scope of the claimed subject matter is not limited in these respects. In general, the operation of a given unit is shown in and described with respect to FIG. 7, below, for one example embodiment for connecting two or more units or devices.

Figure 7:
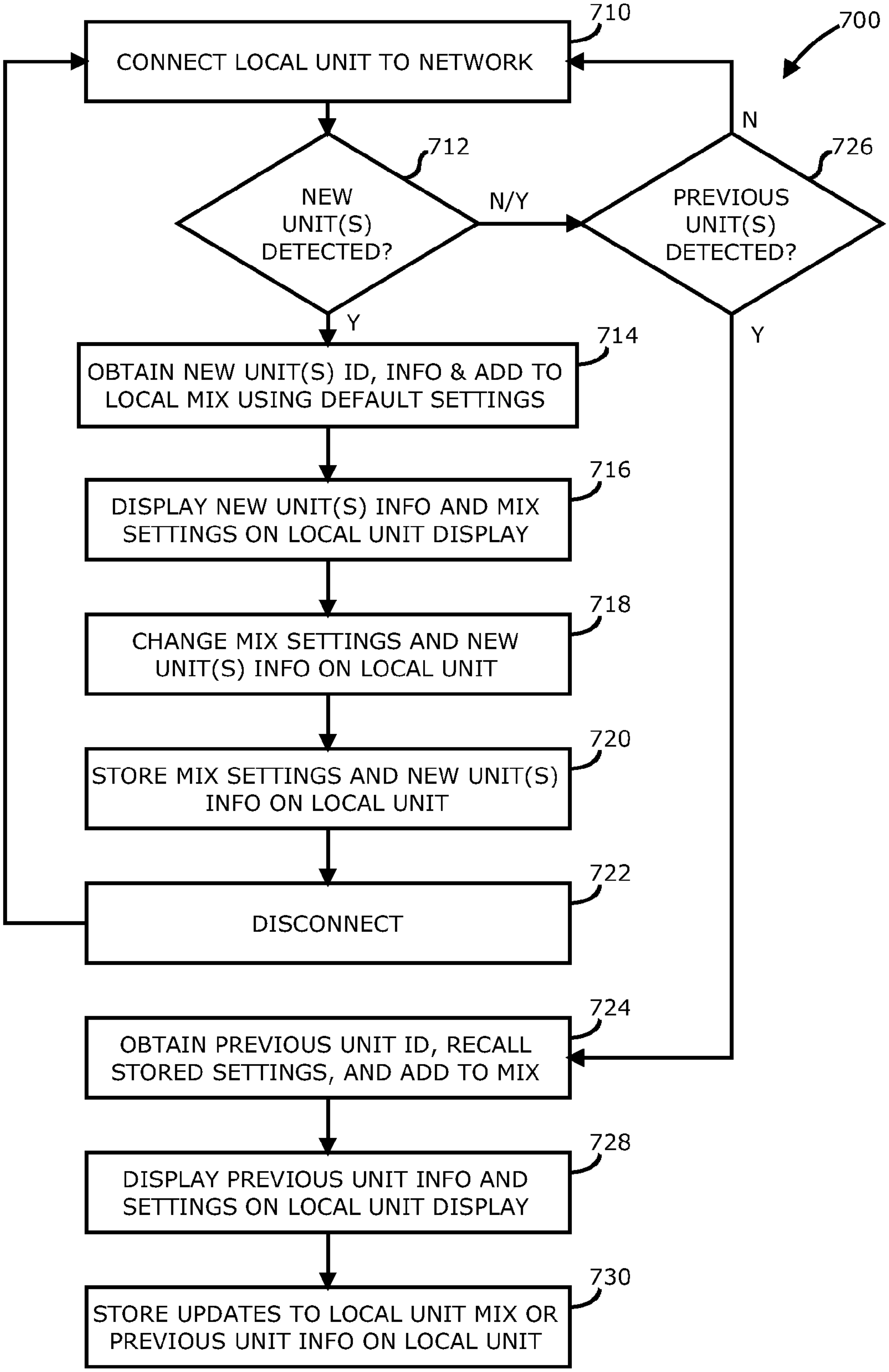
FIG. 7 is a diagram of a method for connecting two or more mixers via a network and displaying and controlling mixer information via a user interface in accordance with one or more embodiments.

Referring now to FIG. 7, a diagram of a method for connecting two or more mixers via a network and displaying and controlling mixer information via a user interface in accordance with one or more embodiments will be discussed. The method 700 of FIG. 7 is discussed in general for a local unit that is capable of coupling with one or more other units via a network. It should be noted that although FIG. 7 shows one particular order and number of the blocks of method 700, various other orders and numbers of blocks, including fewer or more blocks, may likewise be utilized in one or more alternative embodiments, and the scope of the claimed subject matter is not limited in these respects. The local unit may connect to network 116 at block 710. A determination may be made at block 712 whether one or more new units are detected via network 116. A new unit may comprise a unit that the local unit has not previously connected to In the event one or more new units are detected, the local unit may obtain at block 714 an identifier such as a network or MAC address, and/or other information for the one or more new units including the unit name, channel names, and/or channel signals from the other new units wherein the signals from new units may be added to the local mix of the local unit using default settings for new units. The information and/or mix settings of the one or more new units may be displayed on a display of the local unit at block 716. Using the user interface of the local unit, at block 718 the user of the local unit may change the mix setting and/or other information for the one or more new units on the local unit. Further using the user interface of the local unit, at block 720 the user of the local unit may store the mix settings and/or other information of the one or more new units on the local unit for example to a storage device or memory device of the local unit or otherwise coupled to the local unit.

At some point, either the local unit or the one or more other units may disconnect from the network 116 and/or from one another at block 722. In the event the local unit subsequently connects to network 116 at block 710, in the event that no new units are detected at block 712 and one or more previous units are detected at block 726, or alternatively new units are detected at block 712 and one or more previous units are detected at block 726, for the one or more previous units, the local mixer obtains the identifier at block 724 for the one or more previous units via network 116, and based at least in part on the identifier recalls the stored settings for the corresponding one or more previous units and adds the previous units to the local mix of the local unit based at least in part on the recalled stored settings. A previous unit may mean another unit that the local unit has already connected to, either via the present network 116 or via another network, at a previous time. The information for the one or more previous units may be displayed on the display of the local unit at block 728. Using the user interface of the local unit, at block 730 the user of the local unit may then optionally make further changes or updates to the mix and/or other information for the one or more previous units and store the changes or updates to the local unit mix on the local unit or a storage device or memory device in or coupled to the local unit. Method 700 may continue accordingly as the local unit connects to or disconnects from network and detects one or more new units and/or one or more previous units. In the event the local unit does not detect any new units or any previous units, the local unit may stay coupled to network 116 until one or more new or previous units are detected, or until the local unit disconnects from network 116.

Figure 8:
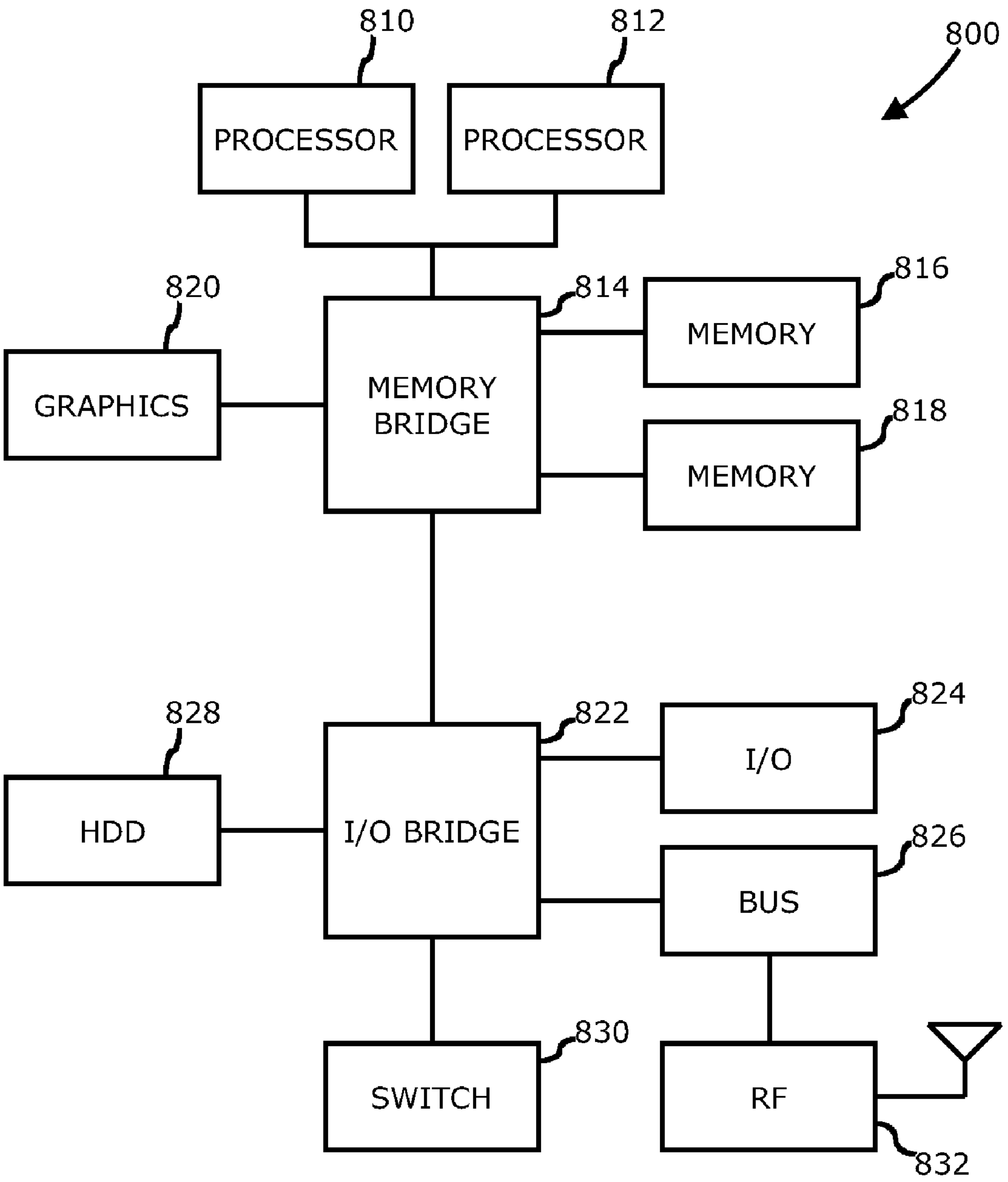
FIG. 8 is a diagram of an information handling system capable of tangibly embodying a mixer and/or a user interface of a mixer in accordance with one or more embodiments.

Referring now to FIG. 8, a block diagram of an information handling system capable of tangibly embodying a mixer and/or a user interface of a mixer in accordance with one or more embodiments will be discussed. Information handling system 800 of FIG. 8 may tangibly embody one or more of any of mixers or units 110, 112, or 116 of system 100 as shown in and described with respect to FIG. 1, or any of ht devices of FIG. 6 such as personal computer 610, mixer 110, device 612, device 614, instrument 618, and/or modeler 620. Although information handling system 800 represents one example of several types of computing platforms, information handling system 800 may include more or fewer elements and/or different arrangements of elements than shown in FIG. 8, and the scope of the claimed subject matter is not limited in these respects.

Information handling system 800 may comprise one or more processors such as processor 810 and/or processor 812, which may comprise one or more processing cores. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor based memory, for example volatile type memory and/or non-volatile type memory. Memory bridge 814 may couple to a graphics system 820 to drive a display device (not shown) coupled to information handling system 800.

Information handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information handling system 800. Bus system 826 may comprise one or more bus systems such as a peripheral component interconnect (PCI) express type bus or the like, to connect one or more peripheral devices to information handling system 800. A hard disk drive (HDD) controller system 828 may couple one or more hard disk drives or the like to information handling system, for example Serial ATA type drives or the like, or alternatively a semiconductor based drive comprising flash memory, phase change, and/or chalcogenide type memory or the like. Switch 830 may be utilized to couple one or more switched devices to I/O bridge 822, for example Gigabit Ethernet type devices or the like. Furthermore, as shown in FIG. 8, information handling system 500 may include a radio-frequency (RF) block 832 comprising RF circuits and devices for wireless communication with other wireless communication devices and/or via wireless networks such as network 116 of FIG. 1, although the scope of the claimed subject matter is not limited in this respect.

In one or more embodiments, information handling system 800 may include a user interface such as a graphical user interface (GUI) that may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiments, transient may refer to being in a state for a brief and/or temporary period of time, and/or passing with time and/or a temporary state of being. In one or more embodiments, an icon may refer to a smaller sized picture that may represent an object, a file, and/or a program, and in some embodiments, an icon may be a thumbnail, wherein a thumbnail may refer to a smaller sized image and/or picture of an object, a file, and/or a program, and/or a portion thereof. However, these are merely example definitions of terms relating to graphical user interfaces and/or computing platforms and/or the like, and the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a user interface for network audio mixers and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:

connecting a first mixer to a network;

if a second mixer is detected on the network, obtaining an identifier for the second mixer;

adding one or more audio signals from the second mixer to a mix of the first mixer; and storing a mix setting for the second mixer on the first mixer; and if the second mixer is subsequently connected to the first mixer, obtaining the identifier for the second mixer;

recalling the stored mix setting for the second mixer based at least in part on the identifier; and adding one or more audio signals from the second mixer to a present mix of the first mixer based at least in part on the recalled mix setting.

2. A method as claimed in claim 1, further comprising:

displaying information for the second mixer on a display of the first mixer, the information for the second mixer including a name of the second mixer, a name for one or more channels of the second mixer, or a signal level for one or more signals of the one or more channels, or combinations thereof.

3. A method as claimed in claim 1, further comprising:

storing information for the second mixer in the first mixer; and if the second mixer is subsequently connected to the first mixer, recalling the stored information for the second mixer; and displaying the recalled information for the second mixer on a display of the first mixer.

4. A method as claimed in claim 2, wherein the information comprises a picture, and icon, a graphic, an avatar, or a video clip, or combinations thereof.

5. A method as claimed in claim 3, wherein the information comprises a picture, and icon, a graphic, an avatar, or a video clip, or combinations thereof.

6. A method as claimed in claim 1, further comprising recording the mix or the present mix of the first mixer, wherein the mix or the present mix of the first mixer includes one or more audio signals of the first mixer and one or more audio signals of the second mixer transmitted to the first mixer via the network.

7. A method as claimed in claim 1, wherein the identifier comprises a network identifier or a media access control identifier, or combinations thereof.

8. A method as claimed in claim 1, further comprising applying a mix setting at the first mixer to one or more audio signals of the second mixer independent of a mix setting at the second mixer of the one or more audio signals of the second mixer.

9. An apparatus, comprising:

means for connecting a first mixer to a network;

if a second mixer is detected on the network, means for obtaining an identifier for the second mixer;

means for adding one or more audio signals from the second mixer to a mix of the first mixer; and means for storing a mix setting for the second mixer on the first mixer; and if the second mixer is subsequently connected to the first mixer, means for obtaining the identifier for the second mixer;

means for recalling the stored mix setting for the second mixer based at least in part on the identifier; and means for adding one or more audio signals from the second mixer to a present mix of the first mixer based at least in part on the recalled mix setting.

10. An apparatus as claimed in claim 9, further comprising:

means for displaying information for the second mixer on a display of the first mixer, the information for the second mixer including a name of the second mixer, a name for one or more channels of the second mixer, or a signal level for one or more signals of the one or more channels, or combinations thereof.

11. An apparatus as claimed in claim 9, further comprising:

means for storing information for the second mixer in the first mixer; and if the second mixer is subsequently connected to the first mixer, means for recalling the stored information for the second mixer; and means for displaying the recalled information for the second mixer on a display of the first mixer.

12. An apparatus as claimed in claim 10, wherein the information comprises a picture, and icon, a graphic, an avatar, or a video clip, or combinations thereof.

13. An apparatus as claimed in claim 11, wherein the information comprises a picture, and icon, a graphic, an avatar, or a video clip, or combinations thereof.

14. An apparatus as claimed in claim 9, further comprising means for recording the mix or the present mix of the first mixer, wherein the mix or the present mix of the first mixer includes one or more audio signals of the first mixer and one or more audio signals of the second mixer transmitted to the first mixer via the network.

15. An apparatus as claimed in claim 9, wherein the identifier comprises a network identifier or a media access control identifier, or combinations thereof.

16. An apparatus as claimed in claim 9, further comprising means for applying a mix setting at the first mixer to one or more audio signals of the second mixer independent of a mix setting at the second mixer of the one or more audio signals of the second mixer.

17. A system, comprising:

a processor and a memory coupled to the processor; and a display coupled to the processor to display information stored in memory, wherein the processor is configured to:

connect the system to a network as a first system;

if a second system is detected on the network, obtain an identifier for the second system, add one or more audio signals from the second system to a mix of the first system, and store a mix setting for the second system on the first system; and if the second system is subsequently connected to the first system, obtain the identifier for the second information handling system, recall the stored mix setting for the second system based at least in part on the identifier, and add one or more audio signals from the second system to a present mix of the first system based at least in part on the recalled mix setting.

18. A system as claimed in claim 17, wherein the processor is further configured to display information for the second system on the display, the information for the second system including a name of the second system, a name for one or more channels of the second system, or a signal level for one or more signals of the one or more channels, or combinations thereof.

19. A system as claimed in claim 17, wherein the processor is further configured to:

store information for the second system in the memory; and if the second system is subsequently connected to the first system, recall the stored information for the second system from the memory, and display the recalled information for the second system on the display.

20. A system as claimed in claim 19, wherein the information comprises a picture, and icon, a graphic, an avatar, or a video clip, or combinations thereof.

* * * * *